(12) United States Patent
Chern et al.

(10) Patent No.: US 9,632,278 B2
(45) Date of Patent: Apr. 25, 2017

(54) IMAGING-CAPTURING AND LIGHT-SENSING OPTICAL APPARATUS

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: EVERREADY PRECISION IND. CORP., Kaohsiung (TW)

( * ) Notice: Subject to any disclaimer, the term of this patent is extended or adjusted under 35 U.S.C. 154(b) by 0 days.

(21) Appl. No.: 14/926,886

(22) Filed: Oct. 29, 2015

(65) Prior Publication Data
US 2017/0068067 A1    Mar. 9, 2017

(30) Foreign Application Priority Data

Sep. 7, 2015 (CN) .......................... 2015 1 0562846
Sep. 7, 2015 (TW) ............................. 104129538 A (51) Int. Cl.
| | |
|---|---|
| H04N 9/73 | (2006.01) |
| G02B 7/02 | (2006.01) |
| G02B 13/00 | (2006.01) |
| G01J 1/04 | (2006.01) |
| G02B 7/08 | (2006.01) |
| H04N 5/225 | (2006.01) |

(52) U.S. Cl.
CPC ............ *G02B 7/021* (2013.01); *G01J 1/0411* (2013.01); *G01J 1/0425* (2013.01); *G02B 7/08* (2013.01); *G02B 13/001* (2013.01); *H04N 5/2252* (2013.01); *H04N 5/2253* (2013.01); *H04N 5/2254* (2013.01)

(58) Field of Classification Search
CPC .................................. H04N 9/68; H04N 9/73
USPC ........................................................ 348/238
See application file for complete search history.

(56) References Cited

U.S. PATENT DOCUMENTS

| | | | | |
|---|---|---|---|---|
| 8,704,906 | B2* | 4/2014 | Yamamoto ............ | H04N 5/235 348/221.1 |
| 2011/0063493 | A1* | 3/2011 | Lee .......................... | G02B 7/08 348/345 |
| 2013/0076965 | A1* | 3/2013 | Dabov ................. | H04N 5/2257 348/340 |
| 2013/0235260 | A1* | 9/2013 | Lakdawala ........... | G06F 1/1605 348/373 |
| 2014/0313403 | A1* | 10/2014 | Chen .................... | H04N 5/2252 348/373 |

(Continued)

*Primary Examiner* — Anthony J Daniels
(74) *Attorney, Agent, or Firm* — Muncy, Geissler, Olds & Lowe, P.C.

(57) ABSTRACT

An image-capturing and light-sensing optical apparatus has both of an image capturing function and a light sensing function. The image-capturing and light-sensing optical apparatus includes a first optical lens module, a second optical lens module and a casing. The casing has a first opening. The first optical lens module includes a first optical lens and a first optical sensor. According to the working distance or the equivalent focal length of the first optical lens module, the size of the first optical lens and the size of the first optical sensor, the maximum field of view is acquired. Consequently, the size of the first opening is determined, and the casing is slim. Under this circumstance, the image-capturing and light-sensing optical apparatus complies with the purpose of miniaturization.

17 Claims, 6 Drawing Sheets

(56) References Cited

U.S. PATENT DOCUMENTS

2016/0006913 A1* 1/2016 Kettunen ............. H04N 5/2258
  348/374

* cited by examiner

IMAGING-CAPTURING AND LIGHT-SENSING OPTICAL APPARATUS

FIELD OF THE INVENTION

The present invention relates to an optical apparatus, and more particularly to an integrated optical apparatus in which an image capturing function and a light sensing function can operate simultaneously and correspondingly.

BACKGROUND OF THE INVENTION

Recently, with the development of science and technology, many opto-electronic/electronic devices are designed toward small size, light weightiness and easy portability. Consequently, these opto-electronic/electronic devices can be applied to mobile business, entertainment or leisure purposes whenever or wherever the users are. In these devices, function of image capturing has been a standard assignment and playing a basic functional unit. Indeed, various image capturing devices are widely used in many kinds of systems such as smart phones, tablet computers, wearable devices or any other appropriate electronic devices, modules, or systems. Since the image capturing devices are small and portable, the users can use the image capturing devices to take images and store the captured images according to the users' demands. Not less common, alternatively the images can be uploaded to the interne through mobile networks so as to implement data transfer.

On the other hand, sensing devices, such as global positioning system (GPS) sensor, environmental sensing senor, proximity sensor, and ambient light sensor, have been developed to give convenience and/or security to users and make system operations smoother and more efficient. However, with the maturity of the sensing devices and the image capturing devices, the overall structures are complicated and bulky. Therefore, it is important to integrate the image capturing devices and the sensing devices to achieve the miniaturization purpose. Meanwhile, because of size reeducation, the integration of common sensing element to typical imaging sensor, such as CMOS type, also may reduce the power consumption of typical sensing element and provide a continuous and simultaneous monitoring. However, in terms of lens optics, it means that we need to integrate two kinds of function, i.e., imaging optics and non-imaging optics, simultaneously in one optical element.

Figure 1:
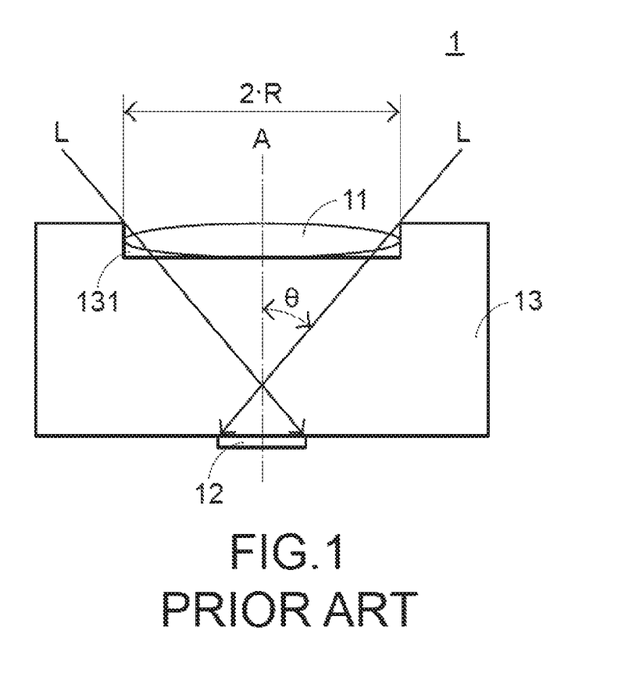
FIG. 1 is a schematic cross-sectional side view illustrating a conventional image capturing device.

FIG. 1 is a schematic cross-sectional side view illustrating a conventional image taking device. As shown in FIG. 1, the conventional image capturing device 1 comprises an optical lens 11, an optical sensor 12 and a casing 13. The optical lens 11 comprises a piece of lens. The light L from an object located outside is introduced into the image capturing device 1 through the optical lens 11. The optical sensor 12 is aligned with the optical lens 11. After the light L is sensed by the optical sensor 12, a corresponding image signal is generated. Consequently, an image corresponding to the image signal is displayed on a display device (not shown) that is connected with the image capturing device 1. The optical lens 11 and the optical sensor 12 are accommodated and positioned within the casing 13. Subsequently, the optical lens 11 and the optical sensor 12 can be normally operated. Moreover, the casing 13 has an opening 11. The optical lens 11 is exposed outside through the opening 131, so that the light L is allowed to pass through the optical lens 11. The optical lens 11 has an optical axis A and a field angle θ, while the corresponding field of view (FOV) is 2θ. The viewing zone of the image capturing device 1 is determined according to the field angle θ. As shown in FIG. 1, the optical lens 11 is a circular lens with a diameter 2×R where R is the radius of the clear aperture. Generally, as the size of the optical lens 11 increases, the field angle θ increases and the viewing zone increases. Moreover, the size of the opening 131 is slightly larger than the effective optical size (or the clear aperture) of the optical lens 11. The illustration here is generally for the function of imaging optics.

If the optical sensor 12 of the image capturing device 1 is with a smaller size, the light L may not be introduced to the optical sensor 12 easily. For solving this problem, a light guide element (not shown) could be arranged between the optical lens 11 and the optical sensor 12 for guiding the light L to the optical sensor 12. Generally, if the field angle θ (or the corresponding FOV) is larger, the light L after passing through the optical lens 11 will have one intersection (which is denoted as "turning point" here) and the turning point will be closer to the optical lens 11. Under this circumstance, it is necessary to install a longer light guide element in order to guide the light L to the optical sensor 12 properly. However, a longer light guide element has impaired guiding efficiency and higher cost, and the arrangement of the longer light guide element also increases the length of the casing 13. It should be noted that in many cases, the introduction of light guiding element make light collection efficiently, and hence the implementation of light guiding element is for the function of non-imaging optics mainly.

In current markets, the conventional image capturing device has two demands required to be matched critically. Firstly, both of the higher FOV and the smaller casing length (or, total track length) should be taken into consideration. Secondly, with the proviso that the size of the optical apparatus is minimized, it is necessary to expand the functions of the optical apparatus and achieve the function of capturing images and monitoring light amount or different wavelengths.

SUMMARY OF THE INVENTION

An objective of the present invention provides an integrated optical apparatus capable of implementing different functions at the same time. Consequently, the functionality of the optical apparatus is enhanced.

Another objective of the present invention provides an integrated optical apparatus comprising an optical lens, an optical sensor and a casing. The size of the opening of the casing and the size of the optical lens are determined according to the size of the optical sensor. Consequently, the integrated optical apparatus can comply with the requirements of larger FOVs or different FOVs and the requirements of slim casings.

In accordance with an aspect of the present invention, there is provided an image-capturing and light-sensing optical apparatus with both of an image capturing function and a sensing function. The image-capturing and light-sensing optical apparatus includes a first optical lens module, a second optical lens module and a casing. The first optical lens module receives the light from an object, thereby capturing an image of the object. The second optical lens module is located beside the first optical lens module, and senses the ambient light, for example, or the light variation of environment. The casing is used for supporting portions of the first optical lens module and the second optical lens module.

In an embodiment, the casing includes a first opening and a second opening, while the two openings may be quite close and may be counted as one opening in one lens surface effectively. The first optical lens module is partially exposed outside through the first opening The second optical lens module is partially exposed outside through the second opening. The first optical lens module includes a first optical lens and a first optical sensor. The first optical lens is fixed on the casing and exposed outside the first opening. The light from one object is allowed to pass through the first optical lens, and the first optical lens has a first viewing zone. The first optical sensor is aligned with the first optical lens. After the light passing through the first optical lens is received by the first optical sensor, the image is acquired by the first optical sensor. A size of the first opening is determined according to a first working distance or a first equivalent focal length of the first optical lens module, a first field of view and a size of the first optical sensor.

In an embodiment, if the first viewing zone of the first optical lens is circular or nearly-circular and an object to be captured is near the first optical lens module, the size of the first opening satisfies mathematic formulae:

$$R_{aM} \cong W_M \cdot \tan \theta_M - R_{sM}, \text{ and } R_{aM} \leq R^*_{aM},$$

wherein if the first viewing zone of the first optical lens is circular or nearly-circular and the object to be captured is far from the first optical lens module, the size of the first opening satisfies mathematic formulae:

$$R_{aM} \cong f_M \cdot \tan \theta_M - R_{sM}, \text{ and } R_{aM} \leq R^*_{aM},$$

wherein $R^*_{aM}$ is a radius of the first opening, $W_M$ is a first working distance of the first optical lens module, $R_{aM}$ is a radius of the first optical lens, $\theta_M$ is the first field angle of the first optical lens, $R_{sM}$ is a radius of the first optical sensor, and $f_M$ is a first equivalent focal length of the first optical lens module. Once the above relations are fulfilled, the minimization of system size could be achieved without a loss of system performance. It should be understood that although the conditions specified here are in terms of field angle (field of view), it can be deduced for a near-by object with specified imaging area A (or sensing area) at a specified distance D mainly the relation follows $$\tan (\text{field angle}) \cong \frac{\sqrt{\text{imaging area } A}}{\sqrt{\pi} * D}$$

In an embodiment, if the first viewing zone of the first optical lens is rectangular or nearly-rectangular and an object to be captured is near the first optical lens module, the size of the first opening satisfies mathematic formulae:

$$R_{aM,x} \cong W_M \cdot \tan \theta_{M,x} - R_{sM,x}, R_{aM,x} \leq R^*_{aM,x};$$

$$R_{aM,y} \cong W_M \cdot \tan \theta_{M,y} - R_{sM,y}, R_{aM,y} \leq R^*_{aM,y};$$

wherein if the first viewing zone of the first optical lens is rectangular or nearly-rectangular and the object to be captured is far from the first optical lens module, the size of the first opening satisfies mathematic formulae:

$$R_{aM,x} \cong f_M \cdot \tan \theta_{M,x} - R_{sM,x}, R_{aM,x} \leq R^*_{aM,x};$$

$$R_{aM,y} \cong f_M \cdot \tan \theta_{M,y} - R_{sM,y}, R_{aM,y} \leq R^*_{aM,y};$$

wherein $R^*_{aM,x}$ is a half length of the first opening along a first direction, $R^*_{aM,y}$ is a half length of the first opening along a second direction, $W_M$ is a first working distance of the first optical lens module, $R_{aM,x}$ is a half length of the first optical lens along the first direction, $R_{aM,y}$ is a half length of the first optical lens along the second direction, $\theta_{M,x}$ is the first field angle of the first optical lens along the first direction, $\theta_{M,y}$ is the first field angle of the first optical lens along the second direction, $R_{sM,x}$ is a half length of the first optical sensor along the first direction, $R_{sM,y}$ is a half length of the first optical sensor along the second direction, and $f_M$ is a first equivalent focal length of the first optical lens module. Once the above relations are fulfilled, the minimization of system size could be achieved without a loss of system performance.

In an embodiment, the second optical lens module includes a second optical lens, a second optical sensor and a light guide element. The second optical lens is located beside the first optical lens, fixed on the casing, and exposed outside the second opening. The (ambient) light is allowed to pass through the second optical lens. The second optical lens has a second viewing zone. The second optical sensor is aligned with the second optical lens. After the light, ambient light, passing through the second optical lens is received by the second optical sensor, the ambient light is sensed by the second optical sensor. A pixel size of the second optical sensor is smaller or much smaller than a pixel size of the first optical sensor. The light guide element is arranged between the second optical lens and the second optical sensor. The ambient light passing through the second optical lens is guided to the second optical sensor by the light guide element. A size of the second opening is determined according to a second working distance or a second equivalent focal length of the second optical lens module, a second field of view and a size of a first surface of the light guide element.

In an embodiment, if the second viewing zone of the second optical lens is circular or nearly-circular and an object to be sensed is near the second optical lens module, the size of the second opening satisfies mathematic formulae:

$$R_{aA} \cong W_A \cdot \tan \theta_A - R_{LA}, \text{ and } R_{aA} \leq R^*_{aA},$$

wherein if the second viewing zone of the second optical lens is circular or nearly-circular and the object to be sensed is far from the second optical lens module, the size of the second opening satisfies mathematic formulae:

$$R_{aA} \cong f_A \cdot \tan \theta_A - R_{LA}, \text{ and } R_{aA} \leq R^*_{aA},$$

wherein $R^*_{aA}$ is a radius of the second opening, $W_A$ is a second working distance of the second optical lens module, $R_{aA}$ is a radius of the second optical lens, $\theta_A$ is the second field angle of the second optical lens, $R_{LA}$ is a radius of the first surface of the light guide element, and $f_A$ is a second equivalent focal length of the second optical lens module. Once the above relations are fulfilled, the minimization of system size could be achieved without a loss of system performance.

In an embodiment, if the second viewing zone of the second optical lens is rectangular or nearly-rectangular and an object to be sensed is near the second optical lens module, the size of the second opening satisfies mathematic formulae:

$$R_{aA,x} \cong W_A \cdot \tan \theta_{A,x} - R_{LA,x}, R_{aA,x} \leq R^*_{aA,x},$$

$$R_{aA,y} \cong W_A \cdot \tan \theta_{A,y} - R_{LA,y}, R_{aA,y} \leq R^*_{aA,y},$$

wherein if the second viewing zone of the second optical lens is rectangular or nearly-rectangular and the object to be sensed is far from the second optical lens module, the size of the second opening satisfies mathematic formulae:

$$R_{aA,x} \cong f_A \cdot \tan \theta_{A,x} - R_{LA,x}, R_{aA,x} \leq R^*_{aA,x};$$

$$R_{aA,y} \cong f_A \cdot \tan \theta_{A,y} - R_{LA,y}, R_{aA,y} \leq R^*_{aA,y};$$

wherein $R^*_{aA,x}$ is a half length of the second opening along a first direction, $R^*_{aA,y}$ is a half length of the second opening along a second direction, $W_A$ is a second working distance of the second optical lens module, $R_{aA,x}$ is a half length of the second optical lens along the first direction, $R_{aA,y}$ is a half length of the second optical lens along the second direction, $\theta_{A,x}$ is the second field angle of the second optical lens along the first direction, $\theta_{A,y}$ is the second field angle of the second optical lens along the second direction, $R_{LA,x}$ is a half length of the first surface of the light guide element along the first direction, $R_{LA,y}$ is a half length of the first surface of the light guide element along the first direction, and $f_A$ is a second equivalent focal length of the second optical lens module. Once the above relations are fulfilled, the minimization of system size could be achieved without a loss of system performance.

In an embodiment, if the first field of view is larger than the second field of view, a first distance corresponding to the first field of view is shorter than a second distance corresponding to the second field of view. The first distance is a distance between the first optical lens and a first turning point corresponding to the first field of view. The second distance is a distance between the second optical lens and a second turning point corresponding to the second field of view.

In an embodiment, an inclined angle (or tilted angle) between the first surface of the light guide element and a second surface of the light guide element is smaller than 10 degrees. The first surface of the light guide element is closer to the second optical lens, and the second surface of the light guide element is closer to the second optical sensor.

In an embodiment, the first surface of the light guide element and a second surface of the light guide element are not in parallel with each other, and one of a first normal vector of the first surface and a second normal vector of the second surface is in parallel with an optical axis of the second optical lens module. The first surface of the light guide element is closer to the second optical lens, and the second surface of the light guide element is closer to the second optical sensor.

In an embodiment, the first surface of the light guide element and a second surface of the light guide element are not in parallel with each other, and an included angle between a first normal vector of the first surface and an optical axis of the second optical lens module and/or an included angle between a second normal vector of the second surface and the optical axis of the second optical lens module are smaller than 60 degrees. The first surface of the light guide element is closer to the second optical lens, and the second surface of the light guide element is closer to the second optical sensor.

In an embodiment, the light guide element is a solid plastic tube with light-guiding directivity, a hollow tube with light-guiding directivity, a microstructure with light-guiding directivity or a metallic reflective surface with light-guiding directivity and reflectivity, or a microstructure with a preferred organization or configuration such that the polarization of light will be fixed for some specific orientation.

In an embodiment, the first optical lens and the second optical lens are integrally formed on a transparent structure, and the transparent structure has the first viewing zone and the second viewing zone.

In an embodiment, the first optical lens is a lens with the corresponding first viewing zone, and the second optical lens is a lens with the corresponding second viewing zone.

In an embodiment, the first optical sensor and the second optical sensor are located at the same plane, and the first optical sensor and the second optical sensor are integrated with each other.

In an embodiment, the first optical sensor and the second optical sensor are stand-alone, and located at different planes.

In an embodiment, the image-capturing and light-sensing optical apparatus further includes a moving mechanism. The moving mechanism is disposed within the casing to move the casing, so that the first optical lens module performs an auto-focusing operation. The moving mechanism moves the casing in an electrically driving manner, a magnetically driving manner, an optically sensing manner or a manual manner.

In an embodiment, the ambient light sensed by the second optical lens module includes the light beams in a first wavelength range, the light beams in a second wavelength range and/or the light beams in a thermal band.

From above descriptions, the present invention provides an image-capturing and light-sensing optical apparatus. The above mathematic formulae can be used to determine the maximum field of view and generate the maximum viewing zone according to the size of the first optical lens, the size of the second optical lens, the size of the first optical sensor and the size of the light guide element. Moreover, the sizes of the corresponding openings of the casing are determined according to the sizes of these optical lenses. Once the above conditions are fulfilled, the minimization of system size could be achieved without a loss of system performance. Since the image-capturing and light-sensing optical apparatus is designed according to the above mathematic formulae, the field of view is larger and the casing is slimmer. Under this circumstance, the image-capturing and light-sensing optical apparatus complies with the purpose of miniaturization. Consequently, the image-capturing and light-sensing optical apparatus of the present invention can be applied to a portable electronic device such as a smart phone, a tablet computer or a wearable device.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For overcoming the drawbacks of the conventional technologies, the present invention provides an image-capturing and light-sensing optical apparatus.

Figure 2:
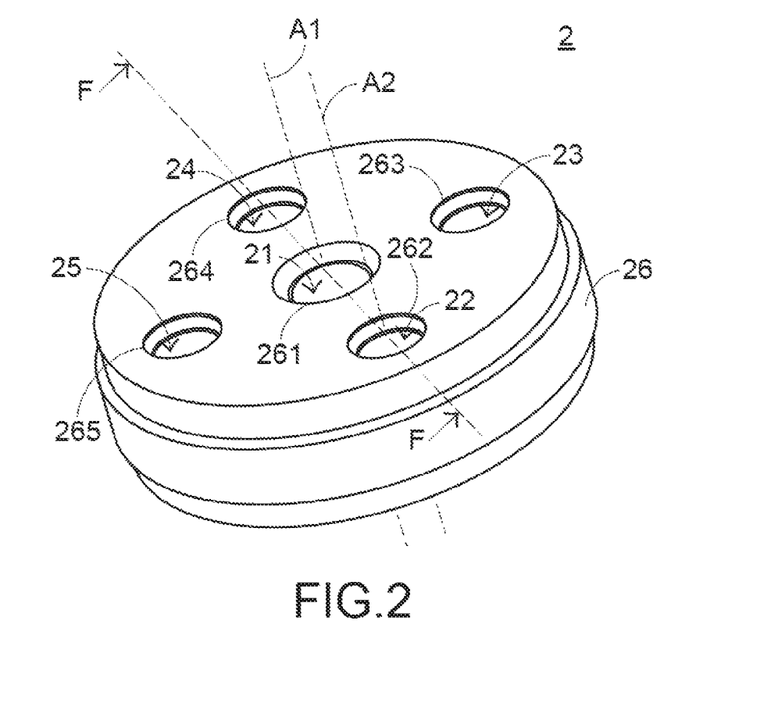
FIG. 2 is a schematic perspective view illustrating the outer appearance of an image-capturing and light-sensing optical apparatus according to a first embodiment of the present invention.
Figure 3:
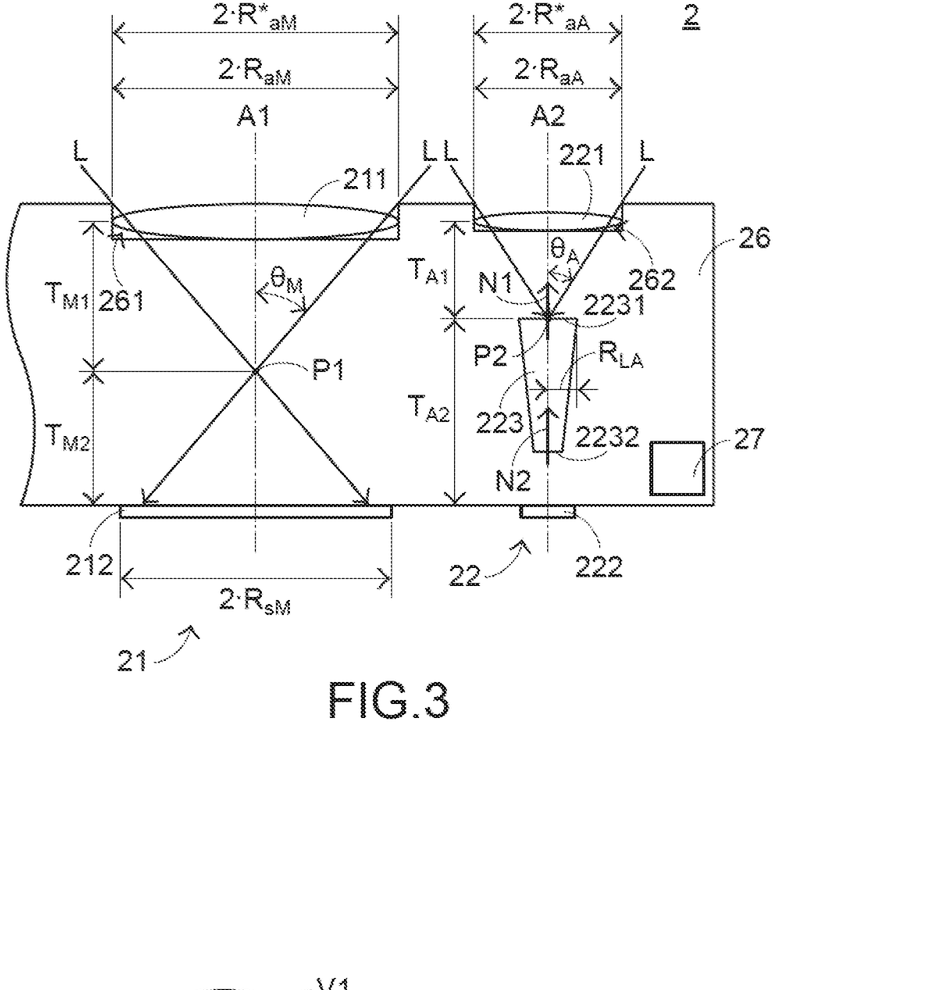
FIG. 3 is a schematic cross-sectional view illustrating a portion of the image-capturing and light-sensing optical apparatus of FIG. 2 and taken along the line F.
Figure 4:
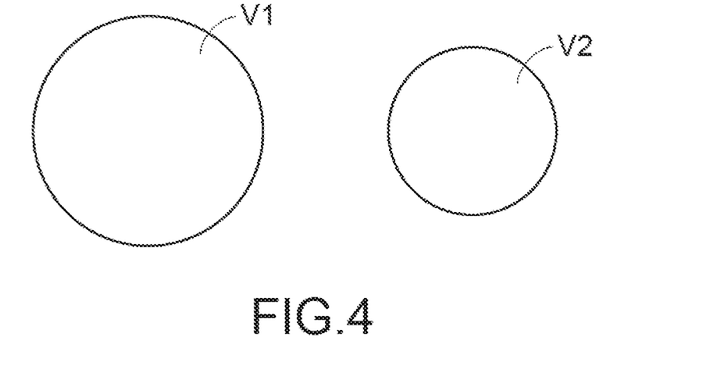
FIG. 4 schematically illustrating a first viewing zone and a second viewing zone of the image-capturing and light-sensing optical apparatus according to the first embodiment of the present invention.

Please refer to FIGS. 2, 3 and 4. FIG. 2 is a schematic perspective view illustrating the outer appearance of an image-capturing and light-sensing optical apparatus according to a first embodiment of the present invention. FIG. 3 is a schematic cross-sectional view illustrating a portion of the image-capturing and light-sensing optical apparatus of FIG. 2 and taken along the line F. FIG. 4 schematically illustrating a first viewing zone and a second viewing zone of the image-capturing and light-sensing optical apparatus according to the first embodiment of the present invention. The image-capturing and light-sensing optical apparatus 2 comprises a first optical lens module 21, a second optical lens module 22, a third optical lens module 23, a fourth optical lens module 24, a fifth optical lens module 25, a casing 26 and a moving mechanism 27. The casing 26 comprises a first opening 261 corresponding to the first optical lens module 21, a second opening 262 corresponding to the second optical lens module 22, a third opening 263 corresponding to the third optical lens module 23, a fourth opening 264 corresponding to the fourth optical lens module 24, and a fifth opening 265 corresponding to the fifth optical lens module 25.

The first optical lens module 21 is located at a center of the casing 26. The first optical lens module 21 comprises a first optical lens 211 and a first optical sensor 212. The first optical lens 211 has a first optical axis A1, a first field angle $\theta_M$ and a first viewing zone V1. The first optical lens 211 is fixed on the casing 26 and exposed outside through the first opening 261, so that the ambient light L is allowed to pass through the first optical lens 211. The first optical sensor 212 is aligned with the first optical lens 211. After the ambient light L passing through the first optical lens 211 is received by the first optical sensor 212, a corresponding image is acquired. In this embodiment, the first field angle $\theta_M$ is the maximum field angle, and hence the FOV, corresponding to the first optical lens 211.

The second optical lens module 22 is located beside the first optical lens module 21. In this embodiment, the second optical lens module 22 comprises a second optical lens 221, a second optical sensor 222 and a light guide element 223. The second optical lens 221 has a second optical axis A2, a second field angle $\theta_A$ and a second viewing zone V2. The second optical lens 221 is fixed on the casing 26 and exposed outside through the second opening 262, so that the ambient light L is allowed to pass through the second optical lens 221. The second optical sensor 222 is aligned with the second optical lens 221. After the ambient light L passes through the second optical lens 221, the ambient light L is received by the second optical sensor 222. Consequently, the second optical sensor 222 can perform a sensing operation (e.g., the operation of sensing the gesture). The light guide element 223 is arranged between the second optical lens 221 and the second optical sensor 222. By the light guide element 223, the ambient light L passing through the second optical lens 221 is guided to the second optical sensor 222. In this embodiment, the second field angle $\theta_A$ is the maximum field angle, and hence the FOV, corresponding to the second optical lens 221.

The third optical lens module 23, the fourth optical lens module 24 and the fifth optical lens module 25 are also located beside the first optical lens module 21. The structures and functions of the third optical lens module 23, the fourth optical lens module 24 and the fifth optical lens module 25 are substantially identical to those of the second optical lens module 22, and are not redundantly described herein. In accordance with the present invention, the pixel size for each of the second optical sensor 222 and the optical sensors of the third optical lens module 23, the fourth optical lens module 24 and the fifth optical lens module 25 is smaller or much smaller than the pixel size of the first optical sensor 212. For example, the pixel size of the first optical sensor 212 is about several millions of pixels, and the pixel size of each optical sensor of the optical lens modules 22~25 is about 1~2 sensing set(s) with n*m pixel array (n≥1,m≥1). The pixel sizes of these optical sensors are presented herein for purpose of illustration and description only.

As shown in FIG. 2, the first optical lens module 21 is a center optical lens module, and the second optical lens module 22, the third optical lens module 23, the fourth optical lens module 24 and the fifth optical lens module 25 are peripheral optical lens modules around the center optical lens module. Moreover, as shown in FIG. 3, the moving mechanism 27 is disposed within the casing 26. The moving mechanism 27 is used for moving the casing 26. As the casing 26 is moved, the first optical lens 211 is correspondingly moved to perform an auto-focusing operation. The moving mechanism 27 can move the casing 26 in an electrically driving manner, a magnetically driving manner, an optically sensing manner or a manual manner.

In an embodiment, the first optical lens 211, the second optical lens 221 and the optical lenses of the third optical lens module 23, the fourth optical lens module 24 and the fifth optical lens module 25 have circular shapes and are on stand-alone lenses. Consequently, as shown in FIG. 4, the first viewing zone V1, the second viewing zone V2, a third viewing zone (not shown), a fourth viewing zone (not shown) and a fifth viewing zone (not shown) corresponding to these optical lenses also have circular shapes. It is noted that numerous modifications and alterations may be made while retaining the teachings of the invention. For example, in another embodiment, the first optical lens, the second optical lens and the optical lenses of the third optical lens module, the fourth optical lens module and the fifth optical lens module are formed on the same transparent structure and integrated with each other.

In an embodiment, the light guide elements of the optical lens modules 22~25 are solid plastic tubes. Moreover, the ambient light L includes the light beams in a first wavelength range, the light beams in a second wavelength range and/or the light beams in a thermal band. For example, the light beams in the first wavelength range are visible beams, the light beams in the second wavelength range are invisible beams, and the light beams in the thermal band are light beams from a thermal source.

The following aspects should be specially described. Firstly, each of the above lenses is made of a plastic material, a glass material or a silicon-based material. Secondly, the light guide element 223 is not restricted to the solid plastic tube. For example, in another embodiment, the light guide element 223 is a hollow tube, a structure having microstructures with light-guiding directivity, or a structure with a metallic reflective surface. Thirdly, in an embodiment, the first optical sensor 212 and the second optical sensor 222 are located at the same plane, but the first optical sensor 212 and the second optical sensor 222 are stand-alone. In another embodiment, the first optical sensor and the second optical sensor are located at the same plane, and the first optical sensor and the second optical sensor are integrated with each other. Alternatively, the first optical sensor and the second optical sensor are stand-alone, and the first optical sensor and the second optical sensor are located at different planes.

Fourthly, as shown in FIG. 3, an included angle between a first surface 2231 of the light guide element 223 and a second surface 2232 of the light guide element 223 is smaller than 10 degrees. Preferably, the first surface 2231 of the light guide element 223 and the second surface 2232 of the light guide element 223 are in parallel with each other. The first surface 2231 of the light guide element 223 is closer to the second optical lens 221, and the second surface 2232 of the light guide element 223 is closer to the second optical sensor 222. Moreover, in case that the first surface 2231 and the second surface 2232 are not in parallel with each other, the image-capturing and light-sensing optical apparatus 2 has one of the following configurations. In the first configuration, one of a first normal vector N1 of the first surface 2231 and a second normal vector N2 of the second surface 2232 is in parallel with a second optical axis A2 of the second optical lens module 22. In the second configuration, the included angle between the first normal vector N1 of the first surface 2231 and the second optical axis A2 of the second optical lens module 22 and/or the included angle between the second normal vector N2 of the second surface 2232 and the second optical axis A2 of the second optical lens module 22 are smaller than 60 degrees. Preferably, both of the first normal vector N1 and the second normal vector N2 are in parallel with the optical axis A2.

Please refer to FIG. 3. In case that the first field of view which is corresponding to field angle $\theta_M$ is larger than the second field of view where the filed angle $\theta_A$, a first distance $T_{M1}$ corresponding to the first field angle $\theta_M$ is shorter than a second distance $T_{A1}$ corresponding to the second field angle $\theta_A$. Moreover, the first distance $T_{M1}$ is the distance between the first optical lens 211 and a first turning point P1 corresponding to the first field angle $\theta_M$, and the second distance $T_{A1}$ is the distance between the second optical lens 221 and a second turning point P2 corresponding to the second field angle $\theta_A$.

The way of designing the sizes of the openings 261~265 of the casing 26 will be illustrated as follows. Take the first opening 261 and the second opening 262 as examples. Please refer to FIG. 3 again. In an embodiment, the size of the first opening 261 is determined according to a first working distance $W_M$ of the first optical lens module 21, the first field angle $\theta_M$ and the size of the first optical sensor 212. In another embodiment, the size of the first opening 261 is determined according to a first equivalent focal length $f_M$ of the first optical lens module 21, the first field angle $\theta_M$ and the size of the first optical sensor 212. In case that the first viewing zone V1 of the first optical lens 211 is circular and the object to be captured is near the first optical lens module 21, the size of the first opening 261 satisfies the following mathematic formulae:

$$R_{aM} \cong W_M \cdot \tan \theta_M - R_{sM}, \text{ and } R_{aM} \leq R^*_{aM}$$

In case that the first viewing zone V1 of the first optical lens 211 is circular and the object to be captured is far from the first optical lens module 21, the size of the first opening 261 satisfies the following mathematic formulae:

$$R_{aM} \cong f_M \cdot \tan \theta_M - R_{sM}, \text{ and } R_{aM} \leq R^*_{aM}$$

In the above mathematic formulae, $R^*_{aM}$ is the radius of the first opening 261, $W_M$ is the first working distance of the first optical lens module 21 (i.e., the sum of the first distance $T_{M1}$ and the second distance $T_{M2}$), $R_{aM}$ is the radius of the first optical lens 211, $\theta_M$ is the first field angle of the first optical lens 211, $R_{sM}$ is the radius of the first optical sensor 212, and $f_M$ is the first equivalent focal length of the first optical lens module 21.

In an embodiment, the size of the second opening 262 is determined according to a second working distance $W_A$ of the second optical lens module 22, the second field angle $\theta_A$ and the size of the second optical sensor 222 of the second optical lens module 22. In another embodiment, the size of the second opening 262 is determined according to a second equivalent focal length $f_A$ of the second optical lens module 22, the second field angle $\theta_A$ and the size of the second optical sensor 222 of the second optical lens module 22. In case that the second viewing zone V2 of the second optical lens 221 is circular and the object to be sensed is near the second optical lens module 22, the size of the second opening 262 satisfies the following mathematic formulae:

$$R_{aA} \cong W_A \cdot \tan \theta_A - R_{LA}, \text{ and } R_{aA} \leq R^*_{aA}$$

In case that the second viewing zone V2 of the second optical lens 221 is circular and the object to be sensed is far from the second optical lens module 22, the size of the second opening 262 satisfies the following mathematic formulae:

$$R_{aA} \cong f_A \cdot \tan \theta_A - R_{LA}, \text{ and } R_{aA} \leq R^*_{aA}$$

In the above mathematic formulae, $R^*_{aA}$ is the radius of the second opening 262, $W_A$ is the second working distance of the second optical lens module 22 (i.e., the sum of a second distance $T_{A1}$ and a fourth distance $T_{A2}$), $R_{aA}$ is the radius of the second optical lens 221, $\theta_A$ is the second field angle of the second optical lens 221, $R_{LA}$ is the radius of the first surface 2231 of the light guide element 223, and $f_A$ is the second equivalent focal length of the second optical lens module 22.

Figure 5A:
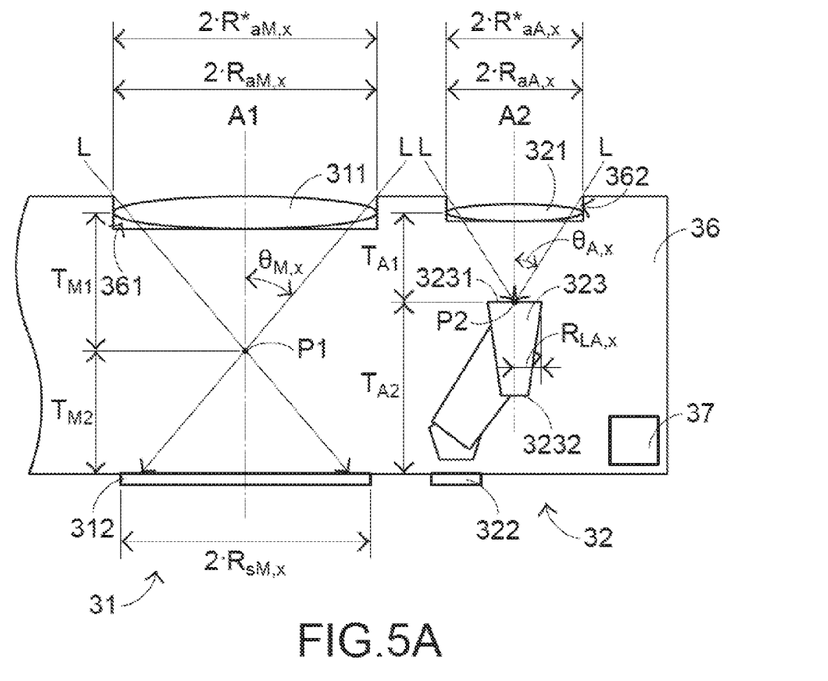
FIG. 5A is a schematic cross-sectional side view illustrating a portion of an image-capturing and light-sensing optical apparatus according to a second embodiment of the present invention and along a first direction.
Figure 5B:
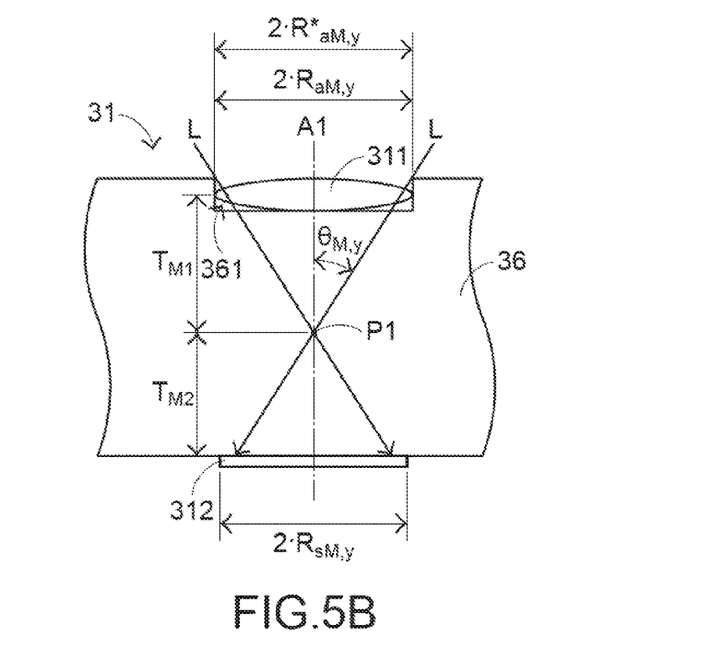
FIG. 5B is a schematic cross-sectional side view illustrating the first optical lens module of the image-capturing and light-sensing optical apparatus according to the second embodiment of the present invention and along a second direction.
Figure 5C:
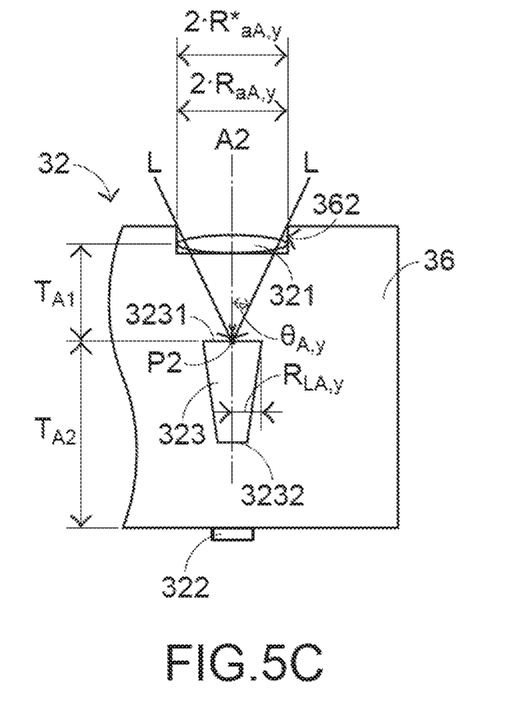
FIG. 5C is a schematic cross-sectional side view illustrating the second optical lens module of the image-capturing and light-sensing optical apparatus according to the second embodiment of the present invention and along the second direction.
Figure 6:
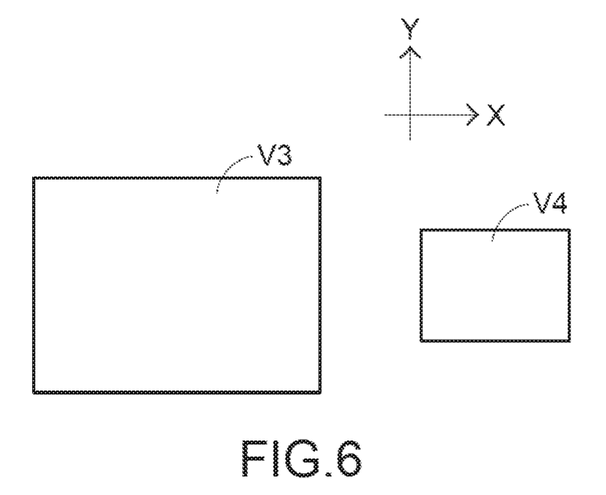
FIG. 6 schematically illustrating a first viewing zone and a second viewing zone of the image-capturing and light-sensing optical apparatus according to the second embodiment of the present invention.

The present invention further provides a second embodiment, which is distinguished from the first embodiment. FIG. 5A is a schematic cross-sectional side view illustrating a portion of an image-capturing and light-sensing optical apparatus according to a second embodiment of the present invention and along a first direction. FIG. 5B is a schematic cross-sectional side view illustrating the first optical lens module of the image-capturing and light-sensing optical apparatus according to the second embodiment of the present invention and along a second direction. FIG. 5C is a schematic cross-sectional side view illustrating the second optical lens module of the image-capturing and light-sensing optical apparatus according to the second embodiment of the present invention and along the second direction. FIG. 6 schematically illustrating a first viewing zone and a second viewing zone of the image-capturing and light-sensing optical apparatus according to the second embodiment of the present invention. Please refer to FIGS. 5A, 5B, 5C and 6. The image-capturing and light-sensing optical apparatus 3 comprises a first optical lens module 31, a second optical lens module 32, a third optical lens module (not shown), a fourth optical lens module (not shown), a fifth optical lens module (not shown), a casing 36 and a moving mechanism 37. The casing 36 comprises a first opening 361 corresponding to the first optical lens module 31, a second opening 362 corresponding to the second optical lens module 32, a third opening (not shown) corresponding to the third optical lens module, a fourth opening (not shown) corresponding to the fourth optical lens module, and a fifth opening (not shown) corresponding to the fifth optical lens module. In comparison with the image-capturing and light-sensing optical apparatus 2 of the first embodiment, the structures of the first optical lens module, the second optical lens module, the third optical lens module, the fourth optical lens module and the fifth optical lens module of the image-capturing and light-sensing optical apparatus 3 of this embodiment are distinguished. The other components of the image-capturing and light-sensing optical apparatus 3 are similar to those of the image-capturing and light-sensing optical apparatus 2, and are not redundantly described herein.

In FIG. 5A, the structures of the first optical lens module 31 and the second optical lens module 32 along the first direction are shown. The first optical lens module 31 comprises a first optical lens 311 and a first optical sensor 312. The first optical lens 311 has a first optical axis A1, a first field angle $\theta_{M,x}$ (and hence the corresponding FOV) along the first direction, a first field angle $\theta_{M,y}$ along the second direction, and a first viewing zone V3. In this embodiment, as shown in FIG. 6, the first optical lens 311 and the first viewing zone V3 are rectangular. In this embodiment, the second optical lens module 32 comprises a second optical lens 321, a second optical sensor 322 and a light guide element 323. The second optical lens 321 has a second optical axis A2, a second field angle $\theta_{A,x}$ along the first direction, a second field angle $\theta_{A,y}$ along the second direction, and a second viewing zone V4. The second optical lens 321 and the second viewing zone V4 are also rectangular. In this embodiment, the light guide element 323 is a free-type light guide element. Moreover, a metallic reflective structure (not shown) is formed on an inner surface of the light guide element 323 for facilitating guiding the ambient light L.

In an embodiment, the size of the first opening 361 is determined according to a first working distance $W_M$ of the first optical lens module 31, the first field of view along the first direction (specified by the field angle $\theta_{M,x}$), the first field of view along the second direction (specified by the field angle $\theta_{M,y}$), and the size of the first optical sensor 312. In another embodiment, the size of the first opening 361 is determined according to a first equivalent focal length $f_M$ of the first optical lens module 31, the first field angle $\theta_M$, along the first direction, the first field angle $\theta_{M,y}$ along the second direction, and the size of the first optical sensor 312. In case that the first viewing zone V3 of the first optical lens 311 is rectangular and the object to be captured is near the first optical lens module 31, the size of the first opening 361 satisfies the following mathematic formulae:

$$R_{aM,x} \cong W_M \cdot \tan \theta_{M,x} - R_{sM,x}, R_{aM,x} \leq R^*_{aM,x};$$

$$R_{aM,y} \cong W_M \cdot \tan \theta_{M,y} - R_{sM,y}, R_{aM,y} \leq R^*_{aM,y}.$$

In case that the first viewing zone V3 of the first optical lens 311 is rectangular and the object to be captured is far from the first optical lens module 31, the size of the first opening 361 satisfies the following mathematic formulae:

$$R_{aM,x} \cong f_M \cdot \tan \theta_{M,x} - R_{sM,x}, R_{aM,x} \leq R^*_{aM,x};$$

$$R_{aM,y} \cong f_M \cdot \tan \theta_{M,y} - R_{sM,y}, R_{aM,y} \leq R^*_{aM,y};$$

In the above mathematic formulae, $R^*_{aM,x}$ is the half length of the first opening 361 along the first direction, $R^*_{aM,y}$ is the half length of the first opening 361 along the second direction, $W_M$ is the first working distance of the first optical lens module 31 (i.e., the sum of the first distance $T_{M1}$ and the second distance $T_{M2}$), $R_{aM,x}$ is the half length of the first optical lens 311 along the first direction, $R_{aM,y}$ is the half length of the first optical lens 311 along the second direction, $\theta_{M,x}$ is the first field angle of the first optical lens 311 along the first direction, $\theta_{M,y}$ is the first field angle of the first optical lens 311 along the second direction, $R_{sM,x}$ is the half length of the first optical sensor 312 along the first direction, $R_{sM,y}$ is the half length of the first optical sensor 312 along the second direction, and $f_M$ is the first equivalent focal length of the first optical lens module 31.

In an embodiment, the size of the second opening 362 is determined according to a second working distance $W_A$ of the second optical lens module 32, the second field angle $\theta_{A,x}$ along the first direction, the second field angle $\theta_{A,y}$ along the second direction, and the size of the second optical sensor 322 of the second optical lens module 32. In another embodiment, the size of the second opening 362 is determined according to a second equivalent focal length $f_A$ of the second optical lens module 32, the second field angle $\theta_{A,x}$ along the first direction, the second field angle $\theta_{A,y}$ along the second direction, and the size of the second optical sensor 322 of the second optical lens module 32. In case that the second viewing zone V4 of the second optical lens 321 is rectangular and the object to be sensed is near the second optical lens module 32, the size of the second opening 362 satisfies the following mathematic formulae:

$$R_{aA,x} \cong W_A \cdot \tan \theta_{A,x} - R_{LA,x}, R_{aA,x} \leq R^*_{aA,x};$$

$$R_{aA,y} \cong W_A \cdot \tan \theta_{A,y} - R_{LA,y}, R_{aA,y} \leq R^*_{aA,y}.$$

In case that the second viewing zone V4 of the second optical lens 321 is rectangular and the object to be sensed is far from the second optical lens module 32, the size of the second opening 362 satisfies the following mathematic formulae:

$$R_{aA,x} \cong f_A \cdot \tan \theta_{A,x} - R_{LA,x}, R_{aA,x} \leq R^*_{aA,x};$$

$$R_{aA,y} \cong f_A \cdot \tan \theta_{A,y} - R_{LA,y}, R_{aA,y} \leq R^*_{aA,y};$$

In the above mathematic formulae, $R^*_{aA,x}$ is is the half length of the second opening 362 along the first direction, $W_{aA,y}$ is the half length of the second opening 362 along the second direction, $W_A$ is the second working distance of the second optical lens module 32 (i.e., the sum of a second distance $T_{A1}$ and a fourth distance $T_{A2}$), $R_{aA,x}$ is the half length of the second optical lens 321 along the first direction, $R_{aA,y}$ is the half length of the second optical lens 321 along the second direction, $\theta_{A,x}$ is the second field angle of the second optical lens 321 along the first direction, $\theta_{A,y}$ is the second field angle of the second optical lens 321 along the second direction, $R_{LA,x}$ is the half length of a first surface 3231 of the light guide element 323 along the first direction, $R_{LA,y}$ is the half length of the first surface 3231 of the light guide element 323 along the second direction, and $f_A$ is the second equivalent focal length of the second optical lens module 32.

It is noted that numerous modifications and alterations may be made while retaining the teachings of the invention. FIGS. 7A~7F are schematic top views illustrating some examples of the arrangement of plural optical lenses of the image-capturing and light-sensing optical apparatus.

Figure 7A:
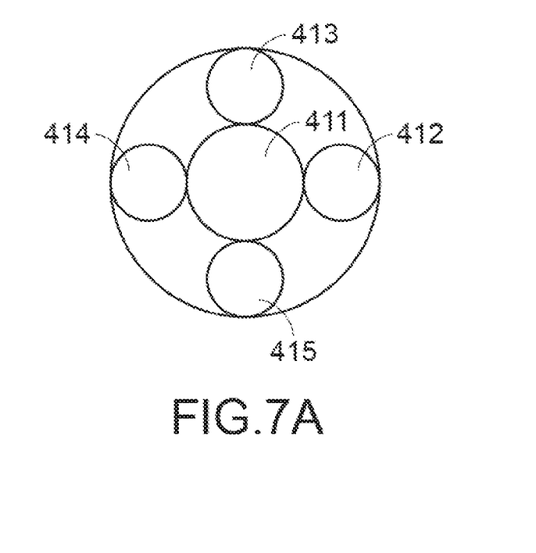
FIGS. 7A~7F are schematic top views illustrating some examples of the arrangement of plural optical lenses of the image-capturing and light-sensing optical apparatus.

As shown in FIG. 7A, a first optical lens 411, a second optical lens 412, a third optical lens 413, a fourth optical lens 414 and a fifth optical lens 415 are integrally formed on the same transparent structure, and the second optical lens 412, the third optical lens 413, the fourth optical lens 414 and the fifth optical lens 415 are arranged around the first optical lens 411. The optical lens module corresponding to the first optical lens 411 has an image-capturing function, and the optical lens modules corresponding to the second optical lens 412, the third optical lens 413, the fourth optical lens 414 and the fifth optical lens 415 have sensing functions.

Figure 7B:
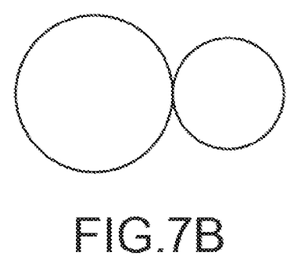
Figure 7C:
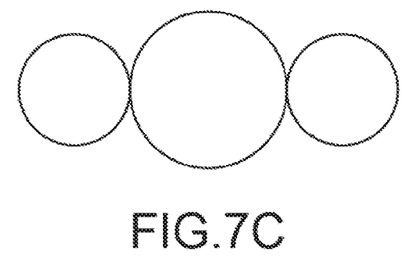
Figure 7D:
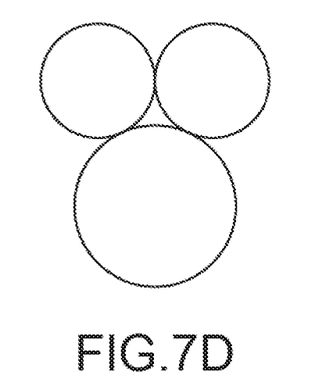
Figure 7E:
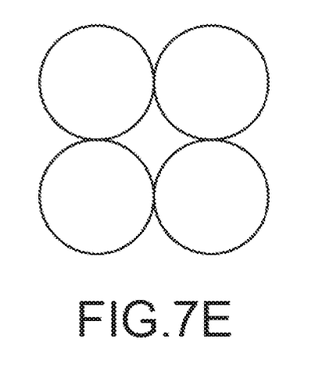
Figure 7F:
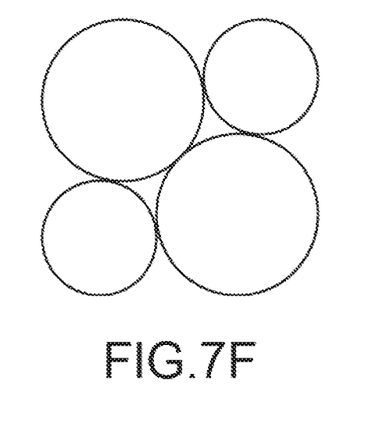

Some other examples of the arrangement of plural optical lenses are shown in FIGS. 7B~7F. In FIG. 7B, two optical lens are integrally formed with each other. In FIGS. 7C and 7D, three optical lenses are integrally formed with each other. In FIGS. 7E and 7F, four optical lenses are integrally formed with each other.

From above descriptions, the present invention provides an image-capturing and light-sensing optical apparatus. The above mathematic formulae can be used to determine the maximum field of view and generate the maximum viewing zone according to the size of the first optical lens, the size of the second optical lens, the size of the first optical sensor and the size of the light guide element. Moreover, the sizes of the corresponding openings of the casing are determined according to the sizes of these optical lenses. Since the image-capturing and light-sensing optical apparatus is designed according to the above mathematic formulae, the field of view is larger and the casing is slimmer. Under this circumstance, the image-capturing and light-sensing optical apparatus complies with the purpose of miniaturization. Consequently, the image-capturing and light-sensing optical apparatus of the present invention can be applied to a portable electronic device such as a smart phone, a tablet computer or a wearable device. It should be understood that although the conditions specified in this document are in terms of field angle (field of view), it can be deduced for a near-by object with specified imaging area A (or sensing area) at a specified distance D the correspondence mainly follows $$\tan(\text{field angle}) \cong \frac{\sqrt{\text{imaging area } A}}{\sqrt{\pi} * D}$$

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image-capturing and light-sensing optical apparatus with both of an image capturing function and a sensing function, the image-capturing and light-sensing optical apparatus comprising:
a first optical lens module receiving an ambient light, thereby capturing an image;
a second optical lens module located beside the first optical lens module, and sensing the ambient light; and
a casing supporting portions of the first optical lens module and the second optical lens module, and comprising a first opening and a second opening, wherein the first optical lens module is partially exposed outside through the first opening, and the second optical lens module is partially exposed outside through the second opening,
wherein the first optical lens module comprises:
a first optical lens fixed on the casing and exposed outside the first opening, wherein the ambient light is allowed to pass through the first optical lens, and the first optical lens has a first viewing zone; and
a first optical sensor aligned with the first optical lens, wherein after the ambient light passing through the first optical lens is received by the first optical sensor, the image is acquired by the first optical sensor,
wherein a size of the first opening is determined according to a first working distance or a first equivalent focal length of the first optical lens module, a first field of view and a size of the first optical sensor.

2. The image-capturing and light-sensing optical apparatus according to claim 1, wherein if the first viewing zone of the first optical lens is circular or nearly-circular and an object to be captured is near the first optical lens module, the size of the first opening satisfies mathematic formulae:

$$R_{aM} \cong W_M \tan \theta_M - R_{sM}, \text{ and } R_{aM} \leq R^*_{aM},$$

wherein if the first viewing zone of the first optical lens is circular or nearly-circular and the object to be captured is far from the first optical lens module, the size of the first opening satisfies mathematic formulae:

$$R_{aM} \cong f_M \tan \theta_M - R_{sM}, \text{ and } R_{aM} \leq R^*_{aM},$$

wherein $R^*_{aM}$ is a radius of the first opening, $W_M$ is a first working distance of the first optical lens module, $R_{aM}$ is a radius of the first optical lens, $\theta_M$ is a first field angle (and hence determines the first field of view) of the first optical lens, $R_{sM}$ is a radius of the first optical sensor, and $f_M$ is a first equivalent focal length of the first optical lens module.

3. The image-capturing and light-sensing optical apparatus according to claim 1, wherein if the first viewing zone of the first optical lens is rectangular or nearly-rectangular and an object to be captured is near the first optical lens module, the size of the first opening satisfies mathematic formulae:

$$R_{aM,x} \cong W_M \tan \theta_{M,x} - R_{sM,x}, R_{aM,x} \leq R^*_{aM,x};$$

$$R_{aM,y} \cong W_M \tan \theta_{M,y} - R_{sM,y}, R_{aM,y} \leq R^*_{aM,y};$$

wherein if the first viewing zone of the first optical lens is rectangular or nearly-rectangular and the object to be captured is far from the first optical lens module, the size of the first opening satisfies mathematic formulae:

$$R_{aM,x} \cong f_M \tan \theta_{M,x} - R_{sM,x}, R_{aM,x} \leq R^*_{aM,x};$$

$$R_{aM,y} \cong f_M \tan \theta_{M,y} - R_{sM,y}, R_{aM,y} \leq R^*_{aM,y};$$

wherein $R^*_{aM,x}$ is a half length of the first opening along a first direction, $R^*_{aM,y}$ is a half length of the first opening along a second direction, $W_M$ is a first working distance of the first optical lens module, $R_{aM,x}$ is a half length of the first optical lens along the first direction, $R_{aM,y}$ is a half length of the first optical lens along the second direction, $\theta_{M,x}$ is the first field angle of the first optical lens along the first direction, $\theta_{M,y}$ is the first field angle of the first optical lens along the second direction, $R_{sM,x}$ is a half length of the first optical sensor along the first direction, $R_{sM,y}$ is a half length of the first optical sensor along the second direction, and $f_M$ is a first equivalent focal length of the first optical lens module.

4. The image-capturing and light-sensing optical apparatus according to claim 1, wherein the second optical lens module comprises:
a second optical lens located beside the first optical lens, fixed on the casing, and exposed outside the second opening, wherein the ambient light is allowed to pass through the second optical lens, and the second optical lens has a second viewing zone;
a second optical sensor aligned with the second optical lens, wherein after the ambient light passing through the second optical lens is received by the second optical sensor, the ambient line is sensed by the second optical sensor, wherein a pixel size of the second optical sensor is smaller than a pixel size of the first optical sensor; and
a light guide element arranged between the second optical lens and the second optical sensor, wherein the ambient light passing through the second optical lens is guided to the second optical sensor by the light guide element, wherein a size of the second opening is determined according to a second working distance or a second equivalent focal length of the second optical lens module, a second field of view and a size of a first surface of the light guide element.

5. The image-capturing and light-sensing optical apparatus according to claim 4, wherein if the second viewing zone of the second optical lens is circular or nearly-circular and an object to be sensed is near the second optical lens module, the size of the second opening satisfies mathematic formulae:

$$R_{aA} \cong W_A \cdot \tan \theta_A - R_{LA}, \text{ and } R_{aA} \leq R^*_{aA},$$

wherein if the second viewing zone of the second optical lens is circular or nearly-circular and the object to be sensed is far from the second optical lens module, the size of the second opening satisfies mathematic formulae:

$$R_{aA} \cong f_A \cdot \tan \theta_A - R_{LA}, \text{ and } R_{aA} \leq R^*_{aA},$$

wherein $R^*_{aA}$ is a radius of the second opening, $W_A$ is a second working distance of the second optical lens module, $R_{aA}$ is a radius of the second optical lens, $\theta_{LA}$ is a second field angle (and hence determines the second field of view) of the second optical lens, $R_{LA}$ is a radius of the first surface of the light guide element, and $f_A$ is a second equivalent focal length of the second optical lens module.

6. The image-capturing and light-sensing optical apparatus according to claim 4, wherein if the second viewing zone of the second optical lens is rectangular or nearly-rectangular and an object to be sensed is near the second optical lens module, the size of the second opening satisfies mathematic formulae:

$$R_{aA,x} \cong W_A \cdot \tan \theta_{A,x} - R_{LA,x}, R_{aA,x} \leq R^*_{aA,x},$$

$$R_{aA,y} \cong W_A \cdot \tan \theta_{A,y} - R_{LA,y}, R_{aA,y} \leq R^*_{aA,y},$$

wherein if the second viewing zone of the second optical lens is rectangular or nearly-rectangular and the object to be sensed is far from the second optical lens module, the size of the second opening satisfies mathematic formulae:

$$R_{aA,x} \cong f_A \cdot \tan \theta_{A,x} - R_{LA,x}, R_{aA,x} \leq R^*_{aA,x};$$

$$R_{aA,y} \cong f_A \cdot \tan \theta_{A,y} - R_{LA,y}, R_{aA,y} \leq R^*_{aA,y};$$

wherein $R^*_{aA,x}$ is a half length of the second opening along a first direction, $R^*_{aA,y}$ is a half length of the second opening along a second direction, $W_A$ is a second working distance of the second optical lens module, $R_{aA,x}$ is a half length of the second optical lens along the first direction, $R_{aA,y}$ is a half length of the second optical lens along the second direction, $\theta_{A,x}$ is the second field angle of the second optical lens along the first direction, $\theta_{A,y}$ is the second field angle of the second optical lens along the second direction, $R_{LA,x}$ is a half length of the first surface of the light guide element along the first direction, $R_{LA,y}$ is a half length of the first surface of the light guide element along the first direction, and $f_A$ is a second equivalent focal length of the second optical lens module.

7. The image-capturing and light-sensing optical apparatus according to claim 4, wherein if the first field of view is larger than the second field of view, a first distance corresponding to the first field of view is shorter than a second distance corresponding to the second field of view, wherein the first distance is a distance between the first optical lens and a first turning point corresponding to the first field of view, and the second distance is a distance between the second optical lens and a second turning point corresponding to the second field of view.

8. The image-capturing and light-sensing optical apparatus according to claim 4, wherein an included angle between the first surface of the light guide element and a second surface of the light guide element is smaller than 10 degrees, wherein the first surface of the light guide element is closer to the second optical lens, and the second surface of the light guide element is closer to the second optical sensor.

9. The image-capturing and light-sensing optical apparatus according to claim 4, wherein the first surface of the light guide element and a second surface of the light guide element are not in parallel with each other, and one of a first normal vector of the first surface and a second normal vector of the second surface is in parallel with an optical axis of the second optical lens module, wherein the first surface of the light guide element is closer to the second optical lens, and the second surface of the light guide element is closer to the second optical sensor.

10. The image-capturing and light-sensing optical apparatus according to claim 4, wherein the first surface of the light guide element and a second surface of the light guide element are not in parallel with each other, and an included angle between a first normal vector of the first surface and an optical axis of the second optical lens module and/or an included angle between a second normal vector of the second surface and the optical axis of the second optical lens module are smaller than 60 degrees, wherein the first surface of the light guide element is closer to the second optical lens, and the second surface of the light guide element is closer to the second optical sensor.

11. The image-capturing and light-sensing optical apparatus according to claim 4, wherein the light guide element is a solid plastic tube with light-guiding directivity, a hollow tube with light-guiding directivity, a microstructure with light-guiding directivity or a metallic reflective surface with light-guiding directivity and reflectivity in which the polarization of light is also selected.

12. The image-capturing and light-sensing optical apparatus according to claim 4, wherein the first optical lens and the second optical lens are integrally formed on a transparent structure, and the transparent structure has the first viewing zone and the second viewing zone.

13. The image-capturing and light-sensing optical apparatus according to claim 4, wherein the first optical lens is a lens with the corresponding first viewing zone, and the second optical lens is a lens with the corresponding second viewing zone.

14. The image-capturing and light-sensing optical apparatus according to claim 4, wherein the first optical sensor and the second optical sensor are located at the same plane, and the first optical sensor and the second optical sensor are integrated with each other.

15. The image-capturing and light-sensing optical apparatus according to claim 4, wherein the first optical sensor and the second optical sensor are stand-alone, and located at different planes.

16. The image-capturing and light-sensing optical apparatus according to claim 1, further comprising a moving mechanism, wherein the moving mechanism is disposed within the casing to move the casing, so that the first optical lens module performs an auto-focusing operation, wherein the moving mechanism moves the casing in an electrically driving manner, a magnetically driving manner, an optically sensing manner or a manual manner.

17. The image-capturing and light-sensing optical apparatus according to claim 1, wherein the ambient light sensed by the second optical lens module includes the light beams in a first wavelength range, the light beams in a second wavelength range and/or the light beams in a thermal band.

* * * * *